(12) United States Patent
Tyrrell et al.

(10) Patent No.: US 10,042,342 B1
(45) Date of Patent: Aug. 7, 2018

(54) MONITORING AND MEASURING POWER USAGE AND TEMPERATURE

(71) Applicant: Best Energy Reduction Technologies, LLC, King Of Prussia, PA (US)

(72) Inventors: Joseph Tyrrell, King Of Prussia, PA (US); Scott J. Yetter, King Of Prussia, PA (US)

(73) Assignee: Best Energy Reduction Technologies, LLC, King of Prussia, PA (US)

( * ) Notice: Subject to any disclaimer, the term of this patent is extended or adjusted under 35 U.S.C. 154(b) by 112 days.

(21) Appl. No.: 15/285,452

(22) Filed: Oct. 4, 2016

Related U.S. Application Data

(60) Provisional application No. 62/238,895, filed on Oct. 8, 2015.

(51) Int. Cl.
| | | |
|---|---|---|
| *G05B 15/02* | (2006.01) |
| *G01K 1/24* | (2006.01) |
| *G01R 21/00* | (2006.01) |
| *H02J 3/00* | (2006.01) |
| *G01K 1/02* | (2006.01) |
| *G01K 1/14* | (2006.01) |
| *H02J 13/00* | (2006.01) |

(52) U.S. Cl.
CPC ............ *G05B 15/02* (2013.01); *G01K 1/024* (2013.01); *G01K 1/14* (2013.01); *G01R 21/00* (2013.01); *H02J 3/00* (2013.01); *H02J 13/0006* (2013.01)

(58) Field of Classification Search
CPC ........ G05B 15/02; H02J 13/0006; H02J 3/00; G01K 1/14; G01K 1/024; G01R 21/00
See application file for complete search history.

(56) References Cited

U.S. PATENT DOCUMENTS

| 5,268,666 A | 12/1993 | Michel et al. |
| 5,880,677 A | 3/1999 | Lestician |
| 6,241,329 B1 | 6/2001 | Nielsen |
| 6,518,724 B2 | 2/2003 | Janik |
| 6,518,980 B1 | 2/2003 | DeMotte et al. |
| 6,642,852 B2 | 11/2003 | Dresti et al. |
| 6,735,705 B1 | 5/2004 | Egbert et al. |

(Continued)

FOREIGN PATENT DOCUMENTS

| JP | 2006203955 | 8/2006 |
| WO | WO2007136213 | 11/2007 |

OTHER PUBLICATIONS

Written Opinion of the ISA for PCT/US2011/042889, dated Feb. 24, 2012.

(Continued)

*Primary Examiner* — Ronald D Hartman, Jr.
(74) *Attorney, Agent, or Firm* — Clause Eight IPS; Michael Catania

(57) ABSTRACT

A system and method for remotely monitoring, measuring and controlling power to an electrically powered device with the use of a temperature sensor is disclosed herein. The temperature sensor is configured to transmit temperature readings for room temperatures to the central command computer to prevent harm to equipment within the facility, wherein the central computer is configured to perform reactive operations for other equipment in order to prevent damage to the other equipment based on the temperature readings received from the temperature sensor.

13 Claims, 12 Drawing Sheets

(56) References Cited

U.S. PATENT DOCUMENTS

| | | | |
|---|---|---|---|
| 6,813,525 B2 | 11/2004 | Reid et al. | |
| 6,870,463 B2 | 3/2005 | Dresti et al. | |
| 6,894,609 B2 | 5/2005 | Menard et al. | |
| 7,049,939 B2 | 5/2006 | Ikeda et al. | |
| 7,171,461 B2 | 1/2007 | Ewing et al. | |
| 7,184,848 B2 | 2/2007 | Krzyzanowski et al. | |
| 7,274,303 B2 | 9/2007 | Dresti et al. | |
| 7,308,611 B2 | 12/2007 | Booth | |
| 7,324,006 B2 | 1/2008 | Godard | |
| 7,482,708 B1 | 1/2009 | Barton | |
| 7,761,186 B2 | 7/2010 | Keller et al. | |
| 7,772,717 B2 | 8/2010 | Kitamura et al. | |
| 7,964,989 B1 | 6/2011 | Puschnigg et al. | |
| 8,093,751 B1 | 1/2012 | Puschnigg et al. | |
| 8,138,626 B2 | 3/2012 | Jonsson et al. | |
| 8,164,876 B2 | 4/2012 | Simi | |
| 8,179,653 B2 | 5/2012 | Gerlach | |
| 8,185,333 B2 | 5/2012 | Johnsson et al. | |
| 9,007,186 B1 | 4/2015 | Krummey et al. | |
| 9,304,500 B2* | 4/2016 | McMahon | G05B 15/02 |
| 9,331,524 B1 | 5/2016 | Yetter | |
| 9,912,152 B2* | 3/2018 | Raneri | H02J 3/005 |
| 2002/0135474 A1 | 9/2002 | Sylliassen | |
| 2003/0042796 A1 | 3/2003 | Donald | |
| 2003/0103304 A1 | 6/2003 | Rendic | |
| 2004/0046677 A1 | 3/2004 | Dresti et al. | |
| 2005/0036258 A1 | 2/2005 | Ma et al. | |
| 2005/0055472 A1 | 3/2005 | Krzyzanowski et al. | |
| 2005/0089079 A1* | 4/2005 | Engel | G01K 3/14 |
| | | | 374/141 |
| 2005/0203647 A1 | 9/2005 | Landry | |
| 2006/0039102 A1 | 2/2006 | Lai | |
| 2006/0114360 A1 | 6/2006 | Kortum et al. | |
| 2007/0008076 A1 | 1/2007 | Rodgers et al. | |
| 2007/0030093 A1 | 2/2007 | Gerszberg et al. | |
| 2007/0114987 A1 | 5/2007 | Kagan | |
| 2007/0115695 A1 | 5/2007 | Lou et al. | |
| 2007/0141869 A1 | 6/2007 | McNeely et al. | |
| 2007/0220907 A1 | 9/2007 | Ehlers | |
| 2008/0015740 A1 | 1/2008 | Osann, Jr. | |
| 2008/0024605 A1* | 1/2008 | Osann, Jr. | G05B 15/02 |
| | | | 348/143 |
| 2008/0049367 A1* | 2/2008 | Carson | H02H 3/12 |
| | | | 361/87 |
| 2008/0127254 A1 | 5/2008 | Nakajima | |
| 2008/0130340 A1 | 6/2008 | Unger et al. | |
| 2008/0183316 A1 | 7/2008 | Clayton | |
| 2008/0309164 A1 | 12/2008 | Lim | |
| 2009/0013210 A1 | 1/2009 | McIntosh et al. | |
| 2009/0027847 A1 | 1/2009 | Li | |
| 2009/0079416 A1 | 3/2009 | Vinden | |
| 2009/0080278 A1 | 3/2009 | Schoenfeld | |
| 2009/0195349 A1 | 8/2009 | Frader-Thompson et al. | |
| 2009/0251127 A1 | 10/2009 | Kim | |
| 2009/0263704 A1 | 10/2009 | Batra | |
| 2009/0289501 A1 | 11/2009 | Garb | |
| 2010/0044195 A1 | 2/2010 | Chiang et al. | |
| 2010/0079001 A1 | 4/2010 | Lee et al. | |
| 2010/0096925 A1 | 4/2010 | Lee et al. | |
| 2010/0148581 A1 | 6/2010 | Gupta et al. | |
| 2010/0152912 A1 | 6/2010 | Huang et al. | |
| 2010/0164299 A1 | 7/2010 | Lee et al. | |
| 2010/0250015 A1 | 9/2010 | Flikkema | |
| 2010/0251157 A1 | 9/2010 | Wendt et al. | |
| 2011/0128661 A1 | 6/2011 | Wiese et al. | |
| 2011/0133655 A1 | 6/2011 | Recker et al. | |
| 2011/0140612 A1 | 6/2011 | Mohan et al. | |
| 2011/0163600 A1 | 7/2011 | Garb et al. | |
| 2011/0169619 A1* | 7/2011 | Lee | G05B 15/02 |
| | | | 340/12.52 |
| 2011/0216457 A1 | 9/2011 | Divan | |
| 2011/0284726 A1 | 11/2011 | Leinen | |
| 2011/0298300 A1* | 12/2011 | Gray | F24F 11/30 |
| | | | 307/116 |
| 2011/0304208 A1 | 12/2011 | Lee et al. | |
| 2011/0310533 A1 | 12/2011 | Cosley et al. | |
| 2012/0013257 A1 | 1/2012 | Sibert | |
| 2012/0014022 A1 | 1/2012 | Lin et al. | |
| 2012/0023994 A1 | 2/2012 | Powell | |
| 2012/0025717 A1 | 2/2012 | Klusmann et al. | |
| 2012/0050936 A1 | 3/2012 | Douglass et al. | |
| 2012/0086272 A1 | 4/2012 | Chen et al. | |
| 2012/0086539 A1 | 4/2012 | Duval et al. | |
| 2012/0112872 A1 | 5/2012 | Kang et al. | |
| 2012/0134063 A1 | 5/2012 | Weil | |
| 2012/0143356 A1 | 6/2012 | Berg-Sonne et al. | |
| 2012/0143387 A1 | 6/2012 | Indovina et al. | |
| 2012/0143810 A1 | 6/2012 | Berg-Sonne | |
| 2012/0150788 A1 | 6/2012 | Berg-Sonne et al. | |
| 2012/0161922 A1 | 6/2012 | Chiang et al. | |
| 2012/0173035 A1 | 7/2012 | Abe | |
| 2012/0209445 A1 | 8/2012 | Kim et al. | |
| 2012/0239219 A1 | 9/2012 | Forbes, Jr. | |
| 2012/0265361 A1* | 10/2012 | Billingsley | H04L 12/12 |
| | | | 700/295 |
| 2014/0006506 A1* | 1/2014 | Frei | H04L 29/1249 |
| | | | 709/204 |
| 2014/0054963 A1* | 2/2014 | Spitchka | G01D 4/002 |
| | | | 307/40 |
| 2014/0191705 A1* | 7/2014 | Takao | H02J 7/0054 |
| | | | 320/103 |
| 2015/0088331 A1* | 3/2015 | Fiedler | G05F 1/66 |
| | | | 700/295 |
| 2015/0249337 A1* | 9/2015 | Raneri | H02J 3/005 |
| | | | 307/24 |
| 2015/0256665 A1* | 9/2015 | Pera | H04L 12/2803 |
| | | | 455/420 |
| 2015/0262468 A1* | 9/2015 | Yang | G01K 1/026 |
| | | | 340/595 |
| 2016/0126783 A1* | 5/2016 | Cheng | H02J 9/061 |
| | | | 307/66 |
| 2017/0070090 A1* | 3/2017 | Miller | H02J 13/0079 |
| 2017/0077693 A1* | 3/2017 | Lermann | G05B 15/02 |
| 2017/0093148 A1* | 3/2017 | Wang | H02H 5/04 |
| 2017/0155526 A1* | 6/2017 | Li | H01R 13/6675 |
| 2017/0155700 A9* | 6/2017 | Bishel | H04L 67/02 |
| 2017/0310109 A1* | 10/2017 | Bollinger, Jr. | H01R 13/11 |

OTHER PUBLICATIONS

Design and Implementation of a High-Fidelity AC Metering Network, Presented at ACM/IEEE International Conference on Information Processing in Sensor Networks, Apr. 15- 18, 2009.

Derwent summary translation for JP2006203955, dated Apr. 16, 2014.

"TalkingPlug Uses RFID-Enabled Power Outlets for Energy Management," Nov. 17, 2009, accessed at <http://www.ridjournal.com/articles/view?5387>.

Tenrehte's PICOwatt Smart Plug System, trademark specimen for PICOWATT trademark, May 12, 2010, accessed at www.cnet.com/news/picowatt-does-smart-grid-without-smart-meter, Jan. 7, 2010.

* cited by examiner

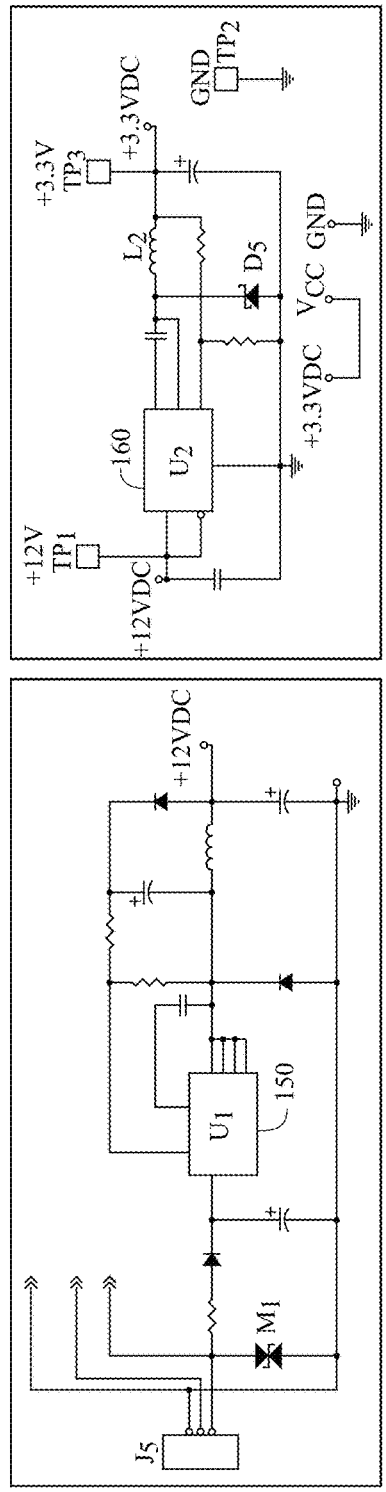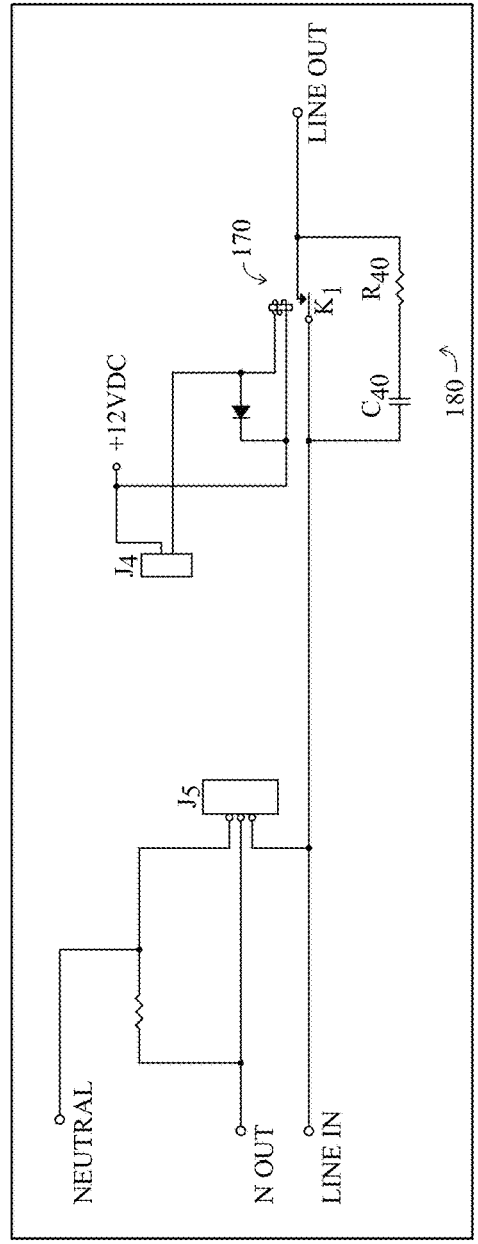
FIG. 7
FIG. 8
FIG. 9

MONITORING AND MEASURING POWER USAGE AND TEMPERATURE

CROSS REFERENCES TO RELATED APPLICATIONS

The present application claims priority to U.S. Provisional Patent Application No. 62/238,895 filed on Oct. 8, 2015, which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to a power control assembly for monitoring, measuring and controlling power usage in a facility. More specifically, the present invention relates to a power control assembly with a temperature sensor.

Description of the Related Art

The prior art discusses various method and systems for controlling power to an electrically powered device.

One example is Dresti et al., U.S. Pat. No. 6,642,852 for a Remote Control Device With Appliance Power Awareness which discloses placing a device in a desired powered state through use of a infrared remote with radiofrequency capabilities.

Another is Lou et al, U.S. Patent Publication Number 2007/0115695 for a Power Supply With Low Standby Loss.

Yet another is Ewing et al., U.S. Pat. No. 7,171,461 for a Network Remote Power Management Outlet Strip.

Yet another is Lee et al., U.S. Publication Number 2010/0079001 for a Outlet Switch Socket Device.

ASHRAE sets forth code compliance for lighting in facilities, particularly lighting shutoff provisions. Further ASHRAE sets forth power reduction levels for lighting in facilities.

The prior art fails to disclose a system and method for remotely monitoring and controlling power usage in a facility, and monitoring a temperature in rooms of the facility.

BRIEF SUMMARY OF THE INVENTION

The present invention provides a system and method for monitoring and controlling power through a power control assembly having a temperature sensor. The present invention provides an effective component for power savings, control and customization for commercial and residential buildings.

One aspect of the present invention is a system for monitoring and controlling electrical power to a device. The system comprises a power control assembly, an electrically-powered device and a controller. The power control assembly comprises a processor configured to monitor and measure a power usage through the assembly, a temperature sensor, and a transceiver for receiving commands to the assembly and for transmitting power usage data from the assembly. The electrically-powered device is electrically powered through the power control assembly. The controller transmits a plurality of commands to the power control assembly. A command of the plurality of commands from the controller can control electrical power to the electrically powered device through the processor of the assembly which is configured to control electrical power to the electrically powered device, and wherein the controller receives power usage data for the electrically-powered device from the transceiver of the power control assembly. The temperature sensor is configured to monitor an internal temperature of the power control assembly. The temperature sensor is configured to monitor a room temperature of a room within a facility.

The power control assembly preferably further comprises a power outlet connection or ether connection. The controller is preferably a smartphone, a computer, tablet computer or a mobile phone. The power control assembly is preferably hard wired into wiring of the facility.

The electrically-powered device is preferably lighting for a predetermined area selected from a room, a building, or a field.

The power control assembly is alternatively a plug-in device. The temperature sensor is preferably configured to transmit a warning if a temperature value of a room of the facility is outside of a configurable threshold high temperature and/or a threshold low temperature.

The temperature sensor is alternatively configured to accommodate/correct a power measurement drift generated by temperature increases and decreases.

In another embodiment, the system further includes a central command computer for a facility, wherein the temperature sensor is configured to transmit temperature readings for room temperatures to the central command computer to prevent harm to equipment within the facility, wherein the central computer is configured to perform reactive operations for other equipment in order to prevent damage to the other equipment based on the temperature readings received from the temperature sensor.

In another embodiment, the system further includes a plurality of power control assemblies within the facility, wherein the power control assembly with a temperature sensor is configured to control the plurality of power control assemblies.

The temperature sensor is preferably disabled or enabled by a command transmitted from the controller.

The power control assembly is preferably integrated into a wall of the plurality of walls of the cubicle and in hard wired electrical communication with the source of electrical power.

In another embodiment, the power control assembly with the temperature sensor is a master to a plurality of slave power control assemblies without temperature sensors, wherein a temperature reading outside of a predetermined threshold from the temperature sensor deactivates the power to the plurality of slave power control assemblies.

The thresholds are preferably configurable and a plurality of ON and OFF rules are configurable to coincide with the thresholds.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 5A is a circuit diagram of a user switch utilized with the system and method for monitoring and controlling electrical power usage to an electrically powered device.

FIG. 7 is a circuit diagram of a component utilized with the system and method for monitoring and controlling electrical power usage to an electrically powered device.

FIG. 8 is a circuit diagram of a component utilized with the system and method for monitoring and controlling electrical power usage to an electrically powered device.

FIG. 9 is a circuit diagram of a component utilized with the system and method for monitoring and controlling electrical power usage to an electrically powered device.

DETAILED DESCRIPTION OF THE INVENTION

Figure 1:
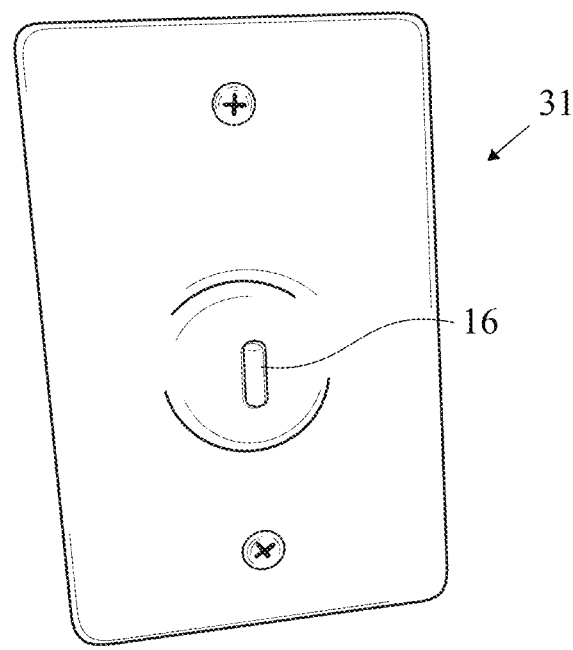
FIG. 1 is an illustration of a power control assembly hard wired into the electrical system of a facility and a temperature sensor.
Figure 2:
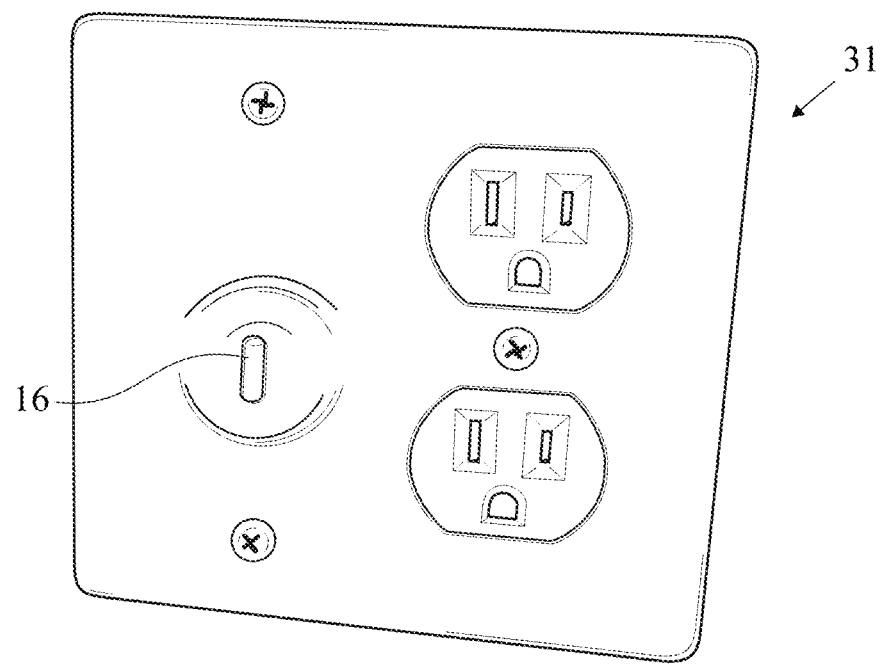
FIG. 2 is an illustration of a power control assembly with outlets, hard wired into the electrical system of a facility and a temperature sensor.

A preferred embodiment of a power control assembly 31 for monitoring and controlling electrical power usage to an electrically powered device is shown in FIGS. 1-4, in the form of a hard wired power control assembly 31 having a power outlet and a temperature sensor. The power outlet is controlled by the power control assembly 31, which is integrated into the facility. The power control assembly 31 preferably controls power to the entire facility, controlling the power outlets and the lighting.

The temperature sensor is incorporated into the power control assembly as temperature sensor add-in software. The temperature sensor is currently built into the measurement hardware integrated circuit chip and requires no additional hardware. The addition of internal firmware programming is all that is needed to activate the sensor. The temperature sensor has the ability to adjust existing power measurements due to drift caused by temperature increases and decreases. This is used in order to keep the measurement as accurate as possible throughout a wide temperature range.

The addition of a temperature sensor to the power control assembly is used primarily, but not limited, to the following: internal power measurement of the power control assembly, remote alerting for internal over heating conditions of the power control assembly, control of lighting devices and indoor and outdoor power outlets of the facility.

The temperature sensor is used to monitor and react to hot and cold temperature conditions in order to compensate for drift in the existing power measurement ability of power control assembly, and is used to monitor for internal overheating conditions of the power control assembly. The temperature sensor is also used to measure and monitor ambient temperatures in any room that a power control assembly is plugged into and to locally or remotely react by controlling devices plugged directly into the power control assemblies or cause a reaction for external devices controlled by a remote temperature receiving controller or computer system. Controlled equipment includes various devices such as lights, heat lamps, heaters, air conditioners, fans and other HVAC related equipment. The temperature sensor is also used as a monitoring system for remotely alerting/notifying users of serious over or under temperature conditions which can be harmful to electronic equipment. Alternatively, alerts are sent to mobile devices of users to warn of a temperature value outside of a predetermined range.

The temperature sensor is preferably built into the existing measurement hardware integrated circuit chip and preferably requires no additional hardware. The addition of internal firmware programming activates the temperature sensor. The temperature sensor has the ability to adjust existing power measurements due to drift caused by temperature increases and decreases. This is used to keep the power measurement as accurate as possible throughout a wide temperature range.

The temperature sensor incorporated into a power control assembly can also be used to perform the following: 1) Monitor internal component heat conditions and wirelessly transmit this information to a remote central controller or command center computer or mobile device; 2) monitor ambient room temperature and wirelessly transmit this information to a remote central controller or command center computer. The controller or command center computer can then utilize this information to control other devices such as HVAC equipment and/or remotely notify users of dangerous temperature conditions via various alerting mechanisms including, but not limited, to: email, text, http UDP and TCP messaging. The equipment controlled based on the temperature readings can also be placed into groups for group control or master slave configurations. 2) Control the ON/OFF state of devices plugged into the power control assembly by monitoring the ambient temperature and reacting to programmable high and low temperature threshold set points which determine whether to power a relay of the power control assembly to the ON or OFF state. 3) The temperature sensor is able to override the programmable power control assembly ON/OFF schedule or manually controlled ON/OFF state. The temperature sensor feature can also be enabled or disabled via the remote Wi-Fi software located on the controller or command center computer.

The following features make the power control assembly with a temperature sensor of the present invention unique from other devices and systems: Wi-Fi command controllable devices. Reactive power measurement adjustments based on temperature. Internal temperature monitoring of power control assemblies for overheating. Ambient room temperature monitoring. Remotely obtainable temperature measurement data over Wi-Fi. Remote enable/disable of sensor feature. Temperature sensor override of manual ON/OFF and schedule ON/OFF conditions. Remotely programmable temperature calibration, high/low temperature threshold set points and individual ON/OFF controls for each. Remote "Group" (mass) control of external heating, cooling and related HVAC devices from a central control system based on temperatures received via power control assembly devices. Temperature Master/Slave Configuration. Remote alerting of dangerous temperature conditions.

The temperature sensor can be used to detect internal component overheating and remotely alert the user of these dangerous conditions.

The temperature sensor is used to monitor ambient room temperatures in any/all rooms equipped with a power control assembly. The measurable temperature range is preferably between 32 and 99 degrees Fahrenheit.

The temperatures for power control assemblies located in any room are sent to a central control computer for further processing including sending alerts/messages or controlling external devices such as HVAC equipment used to regulate and counter the condition.

The temperature sensor feature is enabled or disabled from the remote "controller software" using standard Wi-Fi message protocols.

The temperature sensor overrides manual and scheduled ON/OFF state conditions.

The temperature feature has several externally programmable configurations settings including calibration data, high and low temperature threshold set points and individual ON/OFF states for each set point. The temperature sensor configurations are programmed via remote Wi-Fi messaging from the remote "controller software."

Figure 3:
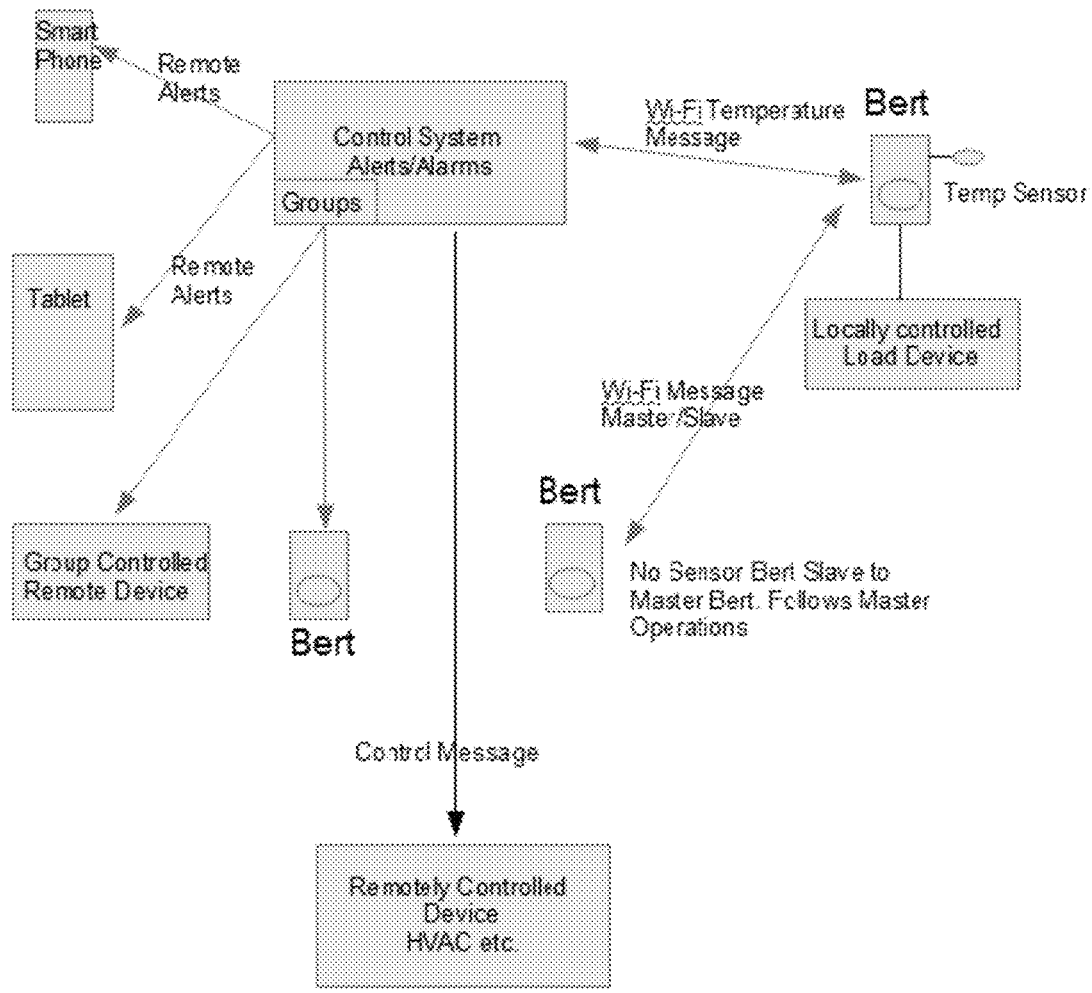
FIG. 3 is a block diagram of a system for a power control assembly with a temperature sensor.

A single temperature sensor power control assembly has the ability to control several other power control assembly units or external temperature/climate control devices via the central command controller using the concept of groups, as shown in FIG. 3. The power control assembly and other devices are placed into groups which are assigned to perform specific tasks keyed off of received temperature readings from power control assemblies.

This feature is optional and allows a single temperature sensor power control assembly (Master) the ability to remotely control several non-temperature sensor power control assemblies (Slave). This allows the system the capability of having one temperature sensor enabled device activate other power control assemblies to follow the state of the master.

The power control assembly preferably transmits the temperature reading to a central control computer over Wi-Fi. The central controller computer then performs further processing of the temperature reading and sends alarm/alerts to users based on a predetermined condition rules established for this system. The alerting is preferably accomplished using various messaging techniques including but not limited to: email, text, http, UDP and TCP messages.

Table One describes an example of the rules for how the temperature sensor interacts with the current power control assembly ON/OFF relay state.

The temperature sensor has the ability to be configured with high and low threshold set points which can also be programmed to either turn the relay to the ON or OFF state when each threshold is reached.

TABLE ONE

| High Threshold | On | Off | Low Threshold | On | Off | Relay State when High | Relay State when Low |
|---|---|---|---|---|---|---|---|
| X | X | — | — | — | — | ON | — |
| X | — | X | — | — | — | — | OFF |
| — | — | — | X | X | — | — | ON |
| — | — | — | X | — | X | — | OFF |
| X | — | X | X | — | X | OFF | OFF |
| X | — | X | X | X | — | OFF | ON |
| X | X | — | X | — | X | ON | OFF |
| X | X | — | X | X | — | ON | ON |

Figure 4:
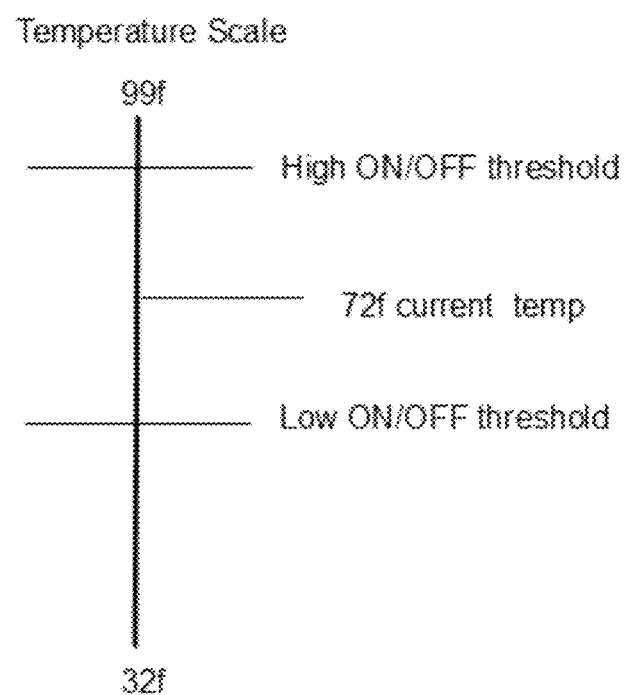
FIG. 4 is an illustration depicting a usable temperature scale and the high and low temperature threshold set points and related ON/OFF state for each threshold.

FIG. 3 is a block diagram of a system 300 for a power control assembly with a temperature sensor. A power control assembly 301 with a temperature sensor sends a WiFi temperature reading message to a control system 302 which sends a control message to a remotely controlled device 305. The control system also sends alerts to multiple mobile devices 310a-c. Other power control assemblies 301a and 301b receive messages from either the power control assembly 301 or the control system 302. FIG. 4 is an illustration depicting a usable temperature scale and the high and low temperature threshold set points and related ON/OFF state for each threshold.

Figure 11:
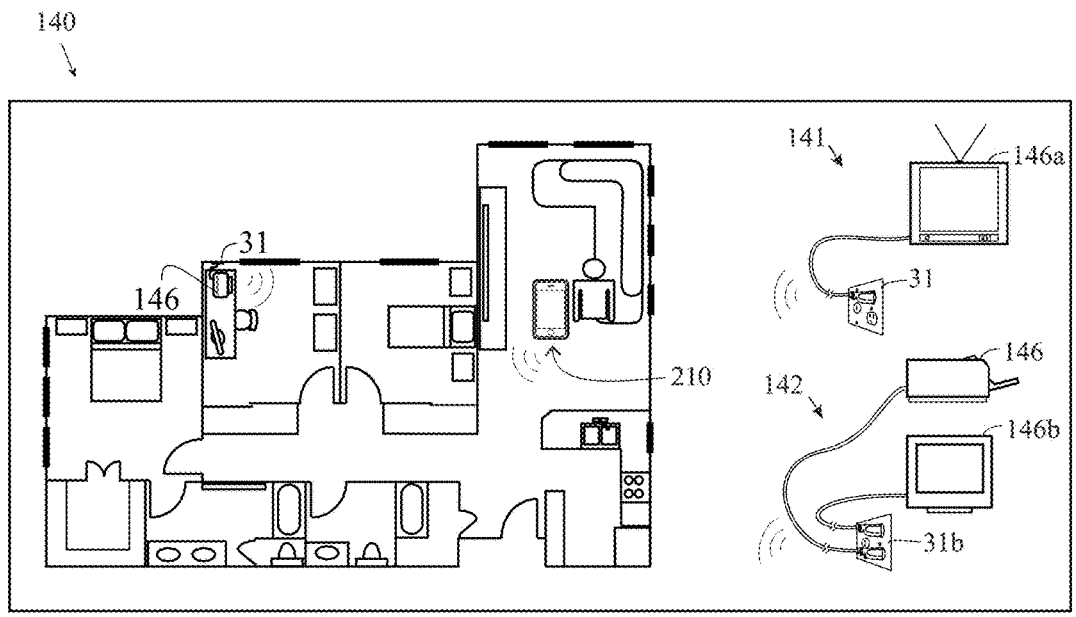
FIG. 11 is a block diagram of a system for monitoring and controlling electrical power usage to an electrically powered device.
Figure 11A:
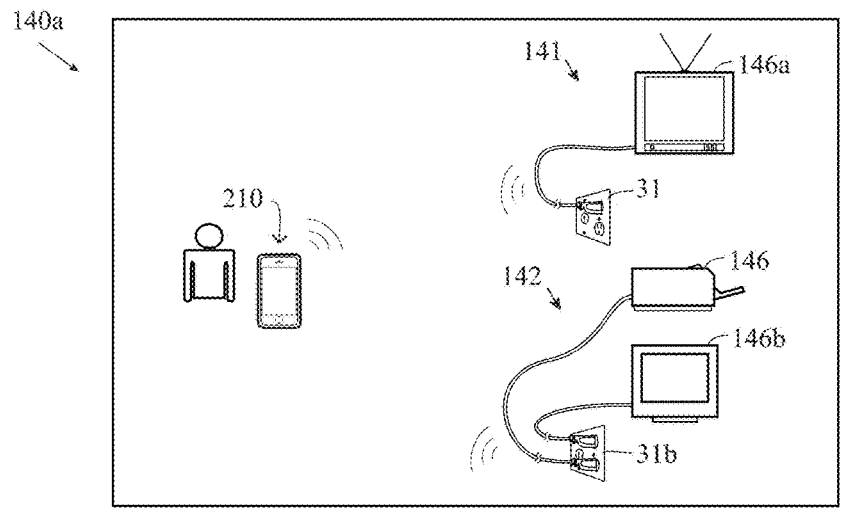
FIG. 11A is a block diagram of a system for monitoring and controlling electrical power usage to an electrically powered device.
Figure 12:
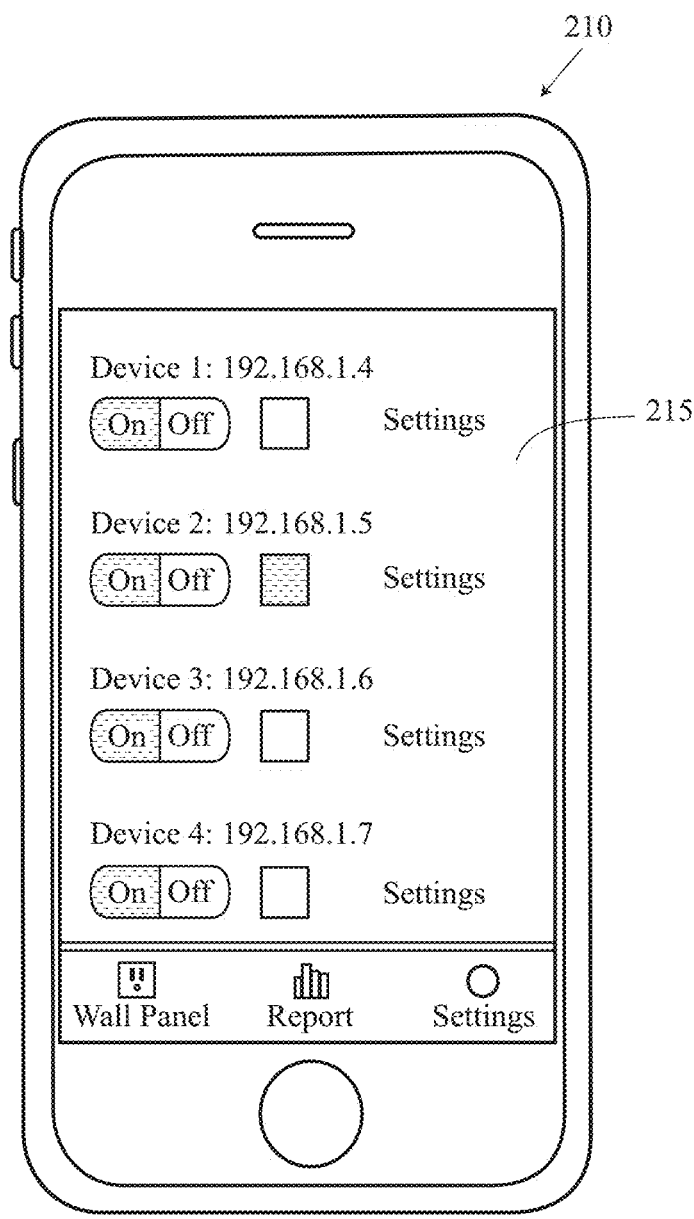
FIG. 12 is a front view of a smart phone for use with a system and method for monitoring and controlling electrical power usage to an electrically powered device.

Another embodiment is shown in FIGS. 11 and 11A, wherein a system 140 is utilized for monitoring and controlling electrical power usage to an electrically powered device in the form of a facility having a power outlet. A computer 146b and printer 146 are controlled by a power control assembly 31b which is integrated into the facility, forming a sub-system 142. A controller 210 of a user is utilized to monitor and control power to the computer through the power control assembly 31b. A television 146a is controlled by power control assembly 31 forming a sub-system 141. The user controls the power to the facility from a distance using the touch screen commands on a display 215 of the controller (smartphone) 210, as shown in FIG. 12. A WiFi signal is sent from the smartphone 210 and received at the antenna, not shown, of the transceiver of the power control assembly 31b. The WiFi signal instructs the microprocessor of the power control assembly 31b to deactivate the electrical power to items in the facility when a signal is received of a temperature reading in excess of a predetermined threshold.

FIGS. 5-10 illustrate circuit diagrams of components of the system for monitoring and controlling electrical power usage to an electrically powered device.

Figure 5:
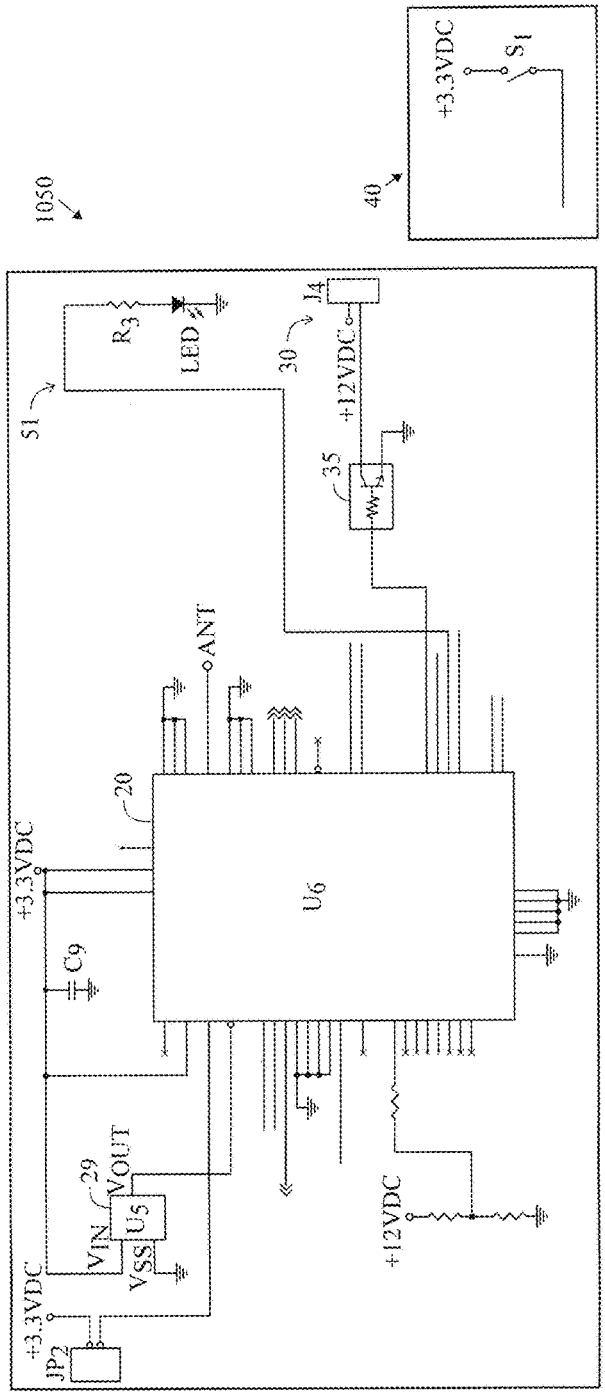
FIG. 5 is a circuit diagram of power control assembly utilized with the system and method for monitoring and controlling electrical power usage to an electrically powered device.
Figure 5B:
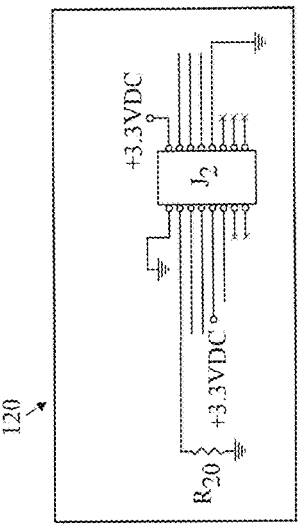
FIG. 5B is a circuit diagram of a component utilized with the system and method for monitoring and controlling electrical power usage to an electrically powered device.
Figure 6:
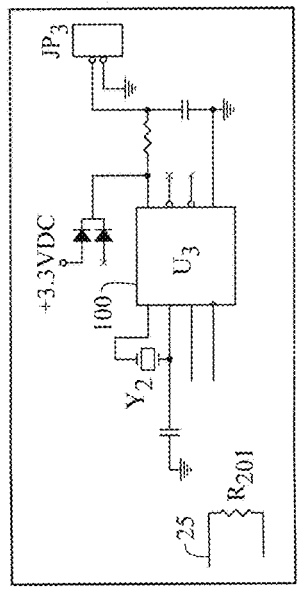
FIG. 6 is a circuit diagram of a component utilized with the system and method for monitoring and controlling electrical power usage to an electrically powered device.
Figure 10:
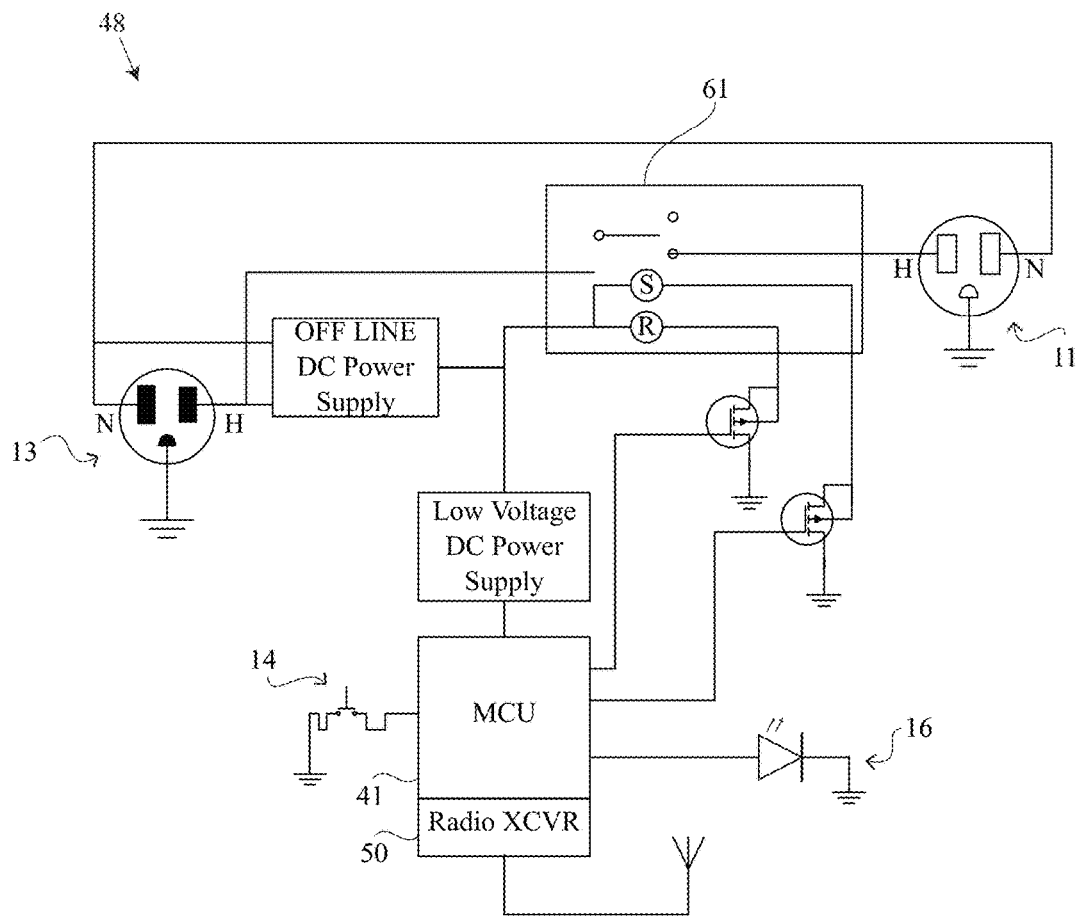
FIG. 10 is a circuit diagram of a component utilized with the system and method for monitoring and controlling electrical power usage to an electrically powered device.

FIG. 5 a circuit diagram of the power control assembly 1050. The power control assembly 1050 comprises at least a radio transceiver, a microprocessor, a switch, and a power converter. Additionally, light-emitting diodes (LED) provide status indication.

The microprocessor receives direct current (DC) power, decodes a control signal from a remote control, such as a handheld device, via the radio transceiver, and then controls the switch based on the decoded control signal.

The switch is preferably a latching relay controlled by the microprocessor, according to the control signal received from the remote control device. Alternatively, the switch is an electro-mechanical relay. Yet alternatively, the switch is an electrical The latching relay minimizes the power usage of the electrical device connected to the apparatus 10, independent of the state of the switch 61.

Further embodiments of the present invention include additional onboard energy storage, with sensing or measuring capabilities, in various form factors embedded or interfaced with various electrical. Additional embodiments of the present invention include combining a single or multiple energy harvesting sources to provide power to control the relay.

Another embodiment is a system with a plurality of cubicles that each has a power control assembly for controlling electrical power usage to an electrically powered device. A user controls power to the cubicles from a distance using the touch screen commands on a touch screen display of the smartphone. A WiFi signal is sent from the smartphone and received at the antenna of the transceiver of the power control assembly. The WiFi signal instructs the microprocessor of the power control assembly to deactivate the electrical power to the cubicles when a signal is received from a temperature sensor of a temperature reading in excess of a predetermined threshold.

The power control assembly permits the user to configure the power control assembly out of the box using a web user interface (WebUI), a personal computer ("PC") program or a WiFi enabled hand held device (smartphone) via ad-hoc wireless, allowing the user to program in home network information, such as the wireless router SSID (Service Set Identifier) and security keys, as necessary for web connectivity.

The WebUI is preferably hosted on the power control assembly 1050 and is accessible via interconnected network devices. The WebUI, PC program or WiFi enabled hand held is addressable via the assigned IP address of the power control assembly. The power control assembly can be controlled from various devices such as, but not limited to, computers or mobile handhelds. In a typical network, a router and the access point provide the wireless connectivity between the power control assembly and the remote, such as a smartphone. In an alternative embodiment of the system, the mobile handheld device wirelessly communicates directly with the antenna of the power control assembly 1050 preferably using a WiFI communication protocol.

The first installed power control assembly is preferably the master power control assembly and monitors the network for any additional apparatus. When a new apparatus is detected on the network, the first installed power control assembly remotely manages other power control assembly using a single WebUI, PC program or WiFi enabled hand held. The user will either: a) logon to the original power control assembly and have selectable tabs and additional options to manage all of the power control assembly on the network; or b) manage each power control assembly discretely using individual IP addresses. Local user settings to the individual power control assembly supersede commands and/or timers from the master power control assembly. The power control assembly is compatible with various web browsers such as, but not limited to, Mozilla Firefox, Microsoft Explorer and Google Chrome.

Figure 13:
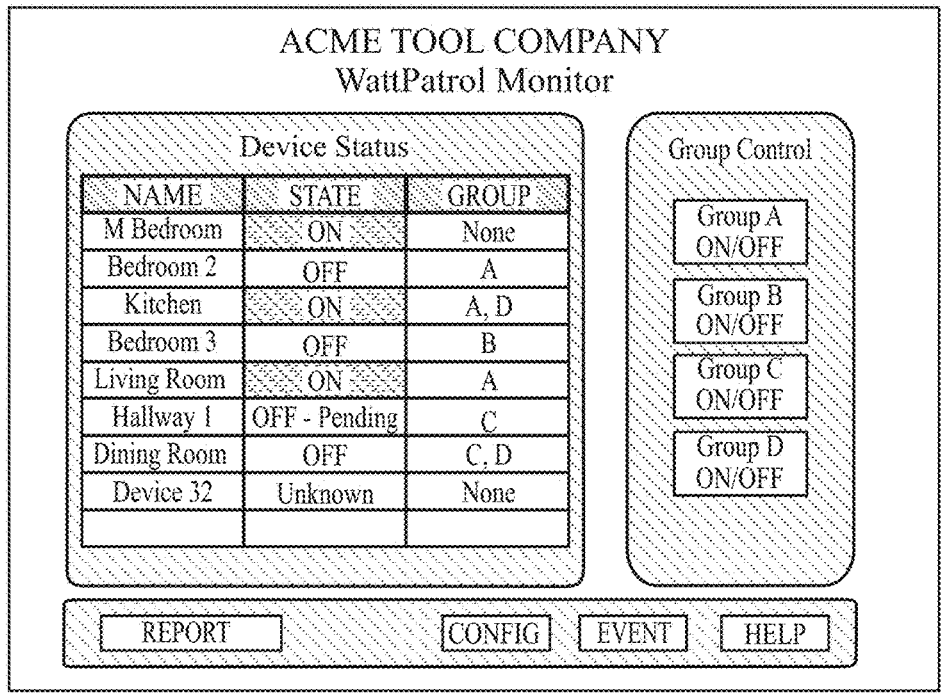
FIG. 13 is a screen view of a status chart of a system for monitoring and controlling electrical power usage to an electrically powered device.

A simple WebUI home page allows individual management and supervision of each cubicle such as, but not limited to, setting multiple timers and toggling ON/OFF selections of multiple cubicles. An example of a web page, of a status window 190, is shown in FIG. 13. The status page 190 displays the status of the devices and users can turn devices OFF or ON from this page.

Figure 14:
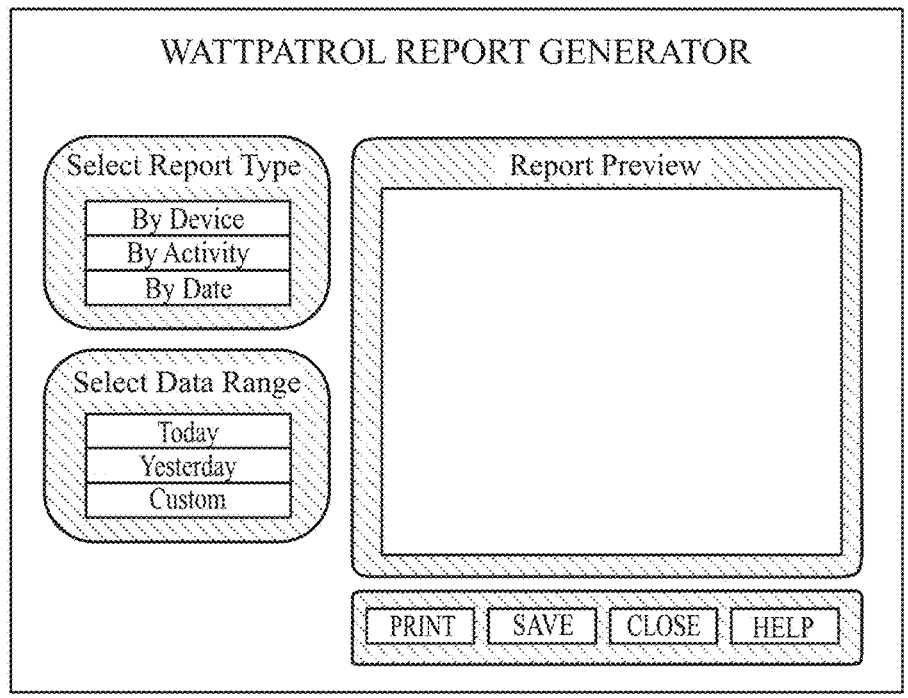
FIG. 14 is a screen view of a report generated by a system for monitoring and controlling electrical power usage to an electrically powered device.

FIG. 14 shows another example of a web page, a report window 200 that a user can access to generate a report in order to analyze or compare the consumption of energy by devices or activities or dates.

Figure 15:
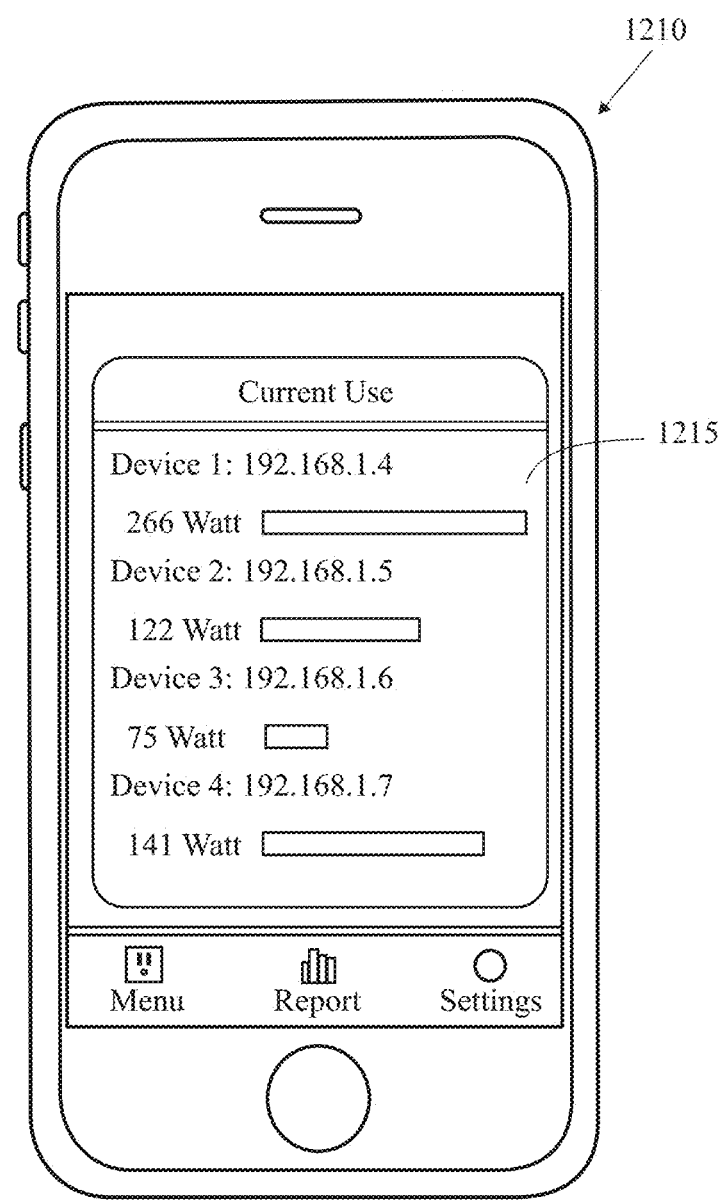
FIG. 15 is a front view of a smart phone for use with a system and method for monitoring and controlling electrical power usage to an electrically powered device.

FIG. 15 is a screen view of smartphone 1210 being used as a controller of a system for controlling power to an electrically powered device. The screen 1215 shows the devices in current use and the wattage used at the current time. For example, Device 1 could be a laptop being used.

Figure 16:
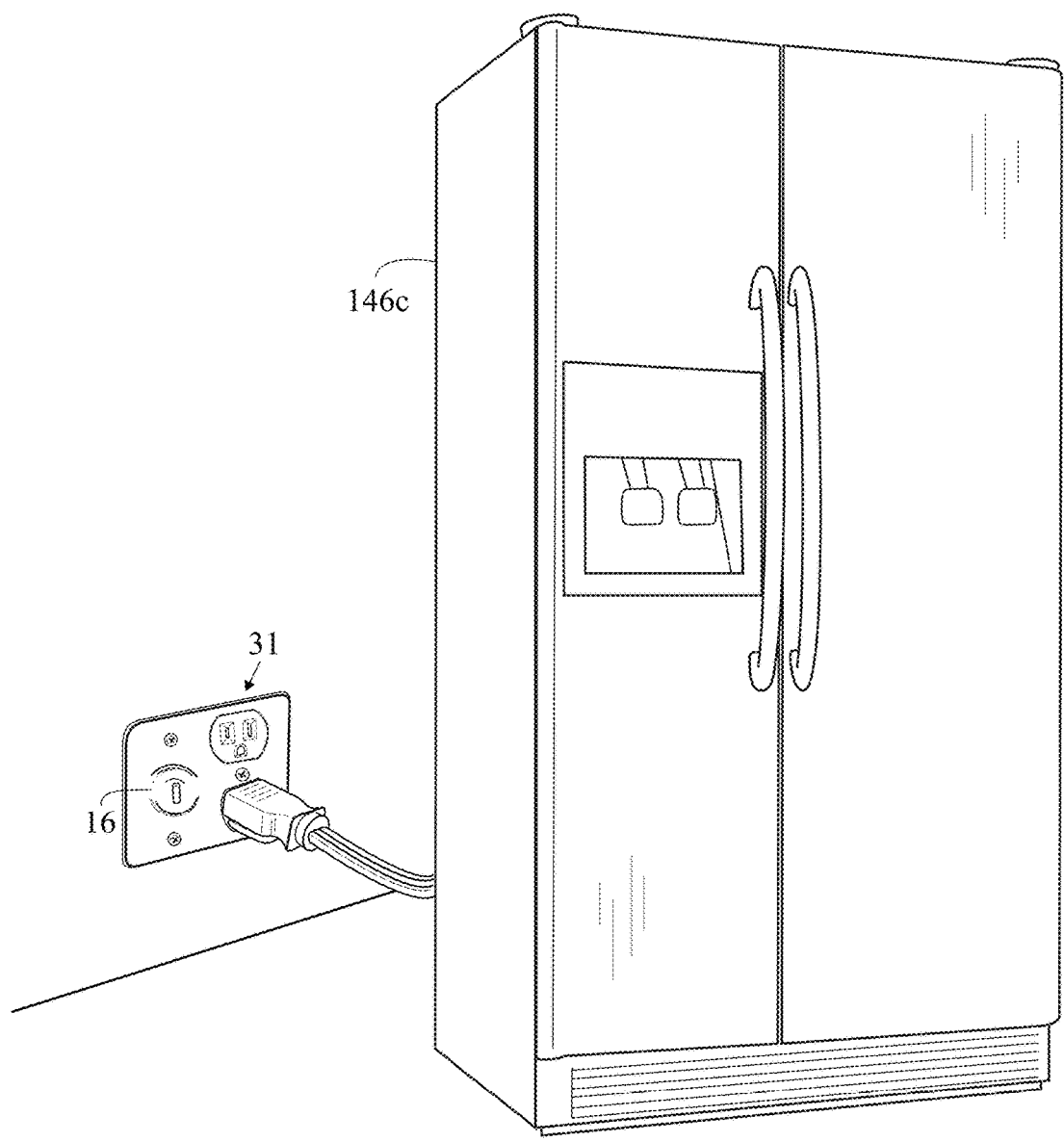
FIG. 16 is an illustration of a refrigerator connected to a power control assembly hard wired into a facility.

As shown in FIG. 16, a refrigerator 146c is connected to a power control assembly 31 hard wired into an electrical assembly of a facility. The power control assembly 31 can monitor power usage of the refrigerator, and warn if power has been terminated to the refrigerator 146c.

Figure 17:
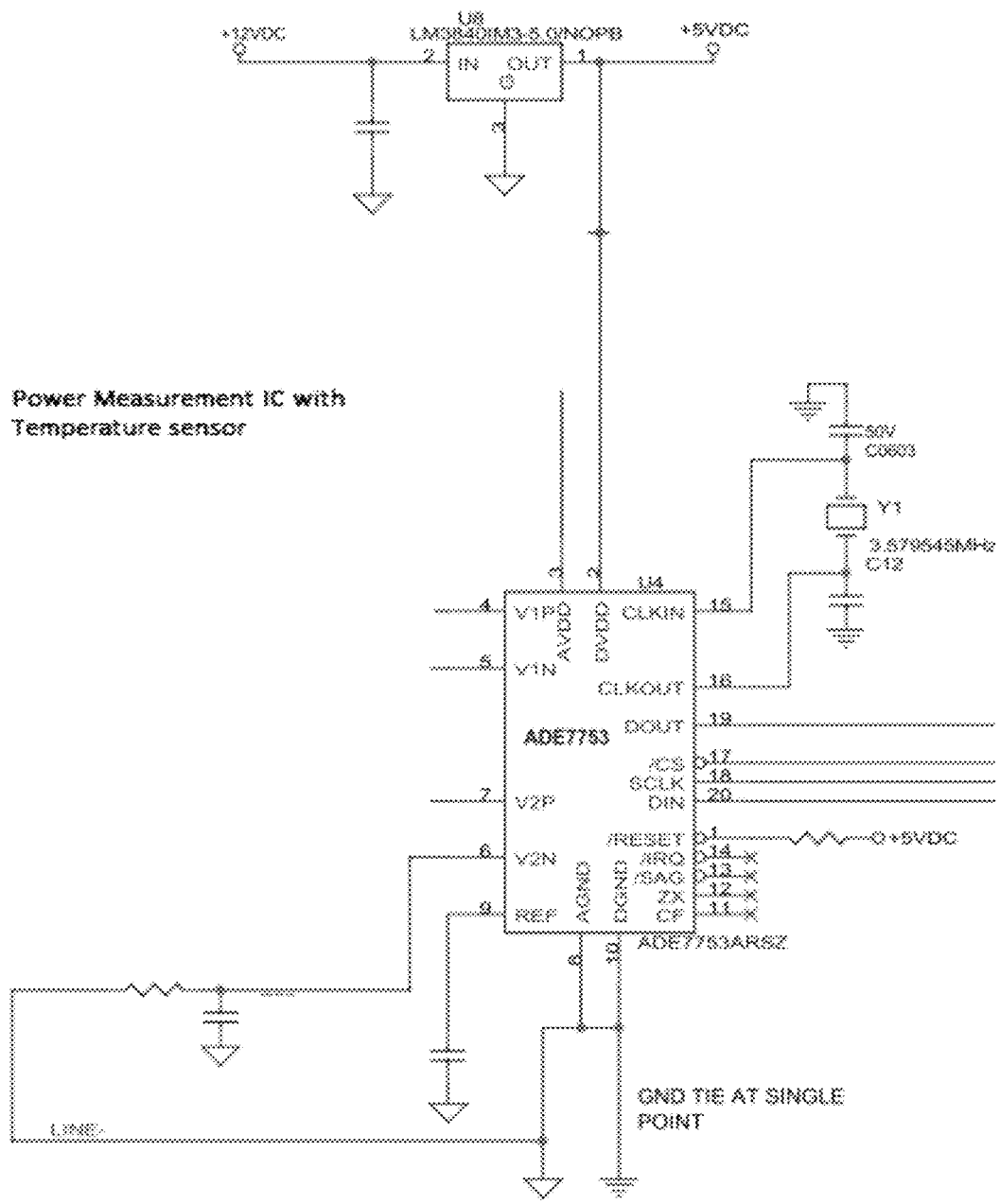
FIG. 17 is a circuit diagram of a power control assembly with a temperature sensor.

FIG. 17 is a circuit diagram of a power control assembly with a temperature sensor.

Further details of power control and monitoring is described in U.S. Pat. Nos. 7,964,989 and 8,093,751 which are hereby incorporation by reference in their entireties. Further details of power control and monitoring is described in U.S. patent application Ser. No. 13/622,399 filed on Sep. 19, 2012 for a Method, System And Apparatus For Controlling Power To A Device which is hereby incorporated by reference in its entirety. Further details of power control and monitoring is described in U.S. patent application Ser. No. 13/624,970 filed on Sep. 24, 2012 for a Method, System And Apparatus For Monitoring And Measuring Power To A Device which is hereby incorporated by reference in its entirety. Further details of power control and monitoring is described in U.S. patent application Ser. No. 13/772,354 filed on Feb. 20, 2013 for a System, Method And Apparatus For Controlling Electrical Power Usage, which is hereby incorporated by reference in its entirety. Further details of power control and monitoring is described in U.S. patent application Ser. No. 13/772,337 filed on Feb. 20, 2013 for a System, Method And Apparatus For Controlling Power Usage, which is hereby incorporated by reference in its entirety. Further details of power control and monitoring is described in U.S. patent application Ser. No. 13/798,166 filed on Mar. 13, 2013 for a Method And Apparatus For Controlling Power To A Device, which is hereby incorporated by reference in its entirety. Further details of power control and monitoring is described in U.S. patent application Ser. No. 13/798,162 filed on Mar. 13, 2013 for a Method, System And Apparatus For Monitoring And Measuring Power To A Device which is hereby incorporated by reference in its entirety. Further details of power control and monitoring is described in Tyrrell et al., U.S. patent application Ser. No. 14/599,491 filed on Jan. 17, 2015 for a Method, System And Apparatus For Monitoring And Measuring Power Usage, which is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim.

Therefore, the embodiments of the invention in which an exclusive property or privilege is claimed are defined in the following appended claims.

We claim as our invention:

1. A system for monitoring and controlling electrical power to a device, the system comprising:
    a power control assembly comprising
        a processor configured to monitor and measure a power usage through the assembly,
        a temperature sensor,
        a transceiver for receiving commands to the assembly and for transmitting power usage data from the assembly;
    an electrically-powered device, the device electrically powered through the power control assembly; and
    a controller for transmitting a plurality of commands to the power control assembly; and
    wherein a command of the plurality of commands from the controller can control electrical power to the electrically powered device through the processor of the assembly which is configured to control electrical power to the electrically powered device, and wherein the controller receives power usage data for the electrically-powered device from the transceiver of the power control assembly;
    wherein the temperature sensor is configured to monitor an internal temperature of the power control assembly;
    wherein the temperature sensor is configured to monitor a room temperature of a room within a facility;
    wherein the temperature sensor is configured to accommodate/correct a power measurement drift generated by temperature increases and decreases.

2. The system according to claim 1 wherein the controller is a smartphone, a tablet computer, a computer, or a mobile phone.

3. The system according to claim 1 further comprising storing the power usage data by one of hour, day, week, month and year.

4. The system according to claim 1 wherein the power control assembly is hard wired into wiring of the facility.

5. The system according to claim 1 wherein the electrically-powered device is lighting for a predetermined area selected from a room, a building, or a field.

6. The system according to claim 1 wherein the power control assembly is a plug-in device.

7. The system according to claim 1 wherein the temperature sensor is configured to transmit a warning if a temperature value of a room of the facility is outside of a configurable threshold high temperature and/or a threshold low temperature.

8. The system according to claim 7 wherein the thresholds are configurable and a plurality of ON and OFF rules are configurable to coincide with the thresholds.

9. The system according to claim 1 further comprising a central command computer for a facility, wherein the temperature sensor is configured to transmit temperature readings for room temperatures to the central command computer to prevent harm to equipment within the facility, wherein the central computer is configured to perform reactive operations for other equipment in order to prevent damage to the other equipment based on the temperature readings received from the temperature sensor.

10. The system according to claim 1 further comprising a plurality of power control assemblies within the facility, wherein the power control assembly with a temperature sensor is configured to control the plurality of power control assemblies.

11. The system according to claim 1 wherein power control assembly is integrated into a wall of a plurality of walls of a cubicle and in hard wired electrical communication with the source of electrical power.

12. A system for monitoring and controlling electrical power to a device, the system comprising:
    a power control assembly comprising
        a processor configured to monitor and measure a power usage through the assembly,
        a temperature sensor,
        a transceiver for receiving commands to the assembly and for transmitting power usage data from the assembly;
    an electrically-powered device, the device electrically powered through the power control assembly; and
    a controller for transmitting a plurality of commands to the power control assembly; and
    wherein a command of the plurality of commands from the controller can control electrical power to the electrically powered device through the processor of the assembly which is configured to control electrical power to the electrically powered device, and wherein the controller receives power usage data for the electrically-powered device from the transceiver of the power control assembly;
    wherein the temperature sensor is configured to monitor an internal temperature of the power control assembly;
    wherein the temperature sensor is configured to monitor a room temperature of a room within a facility;
    wherein the temperature sensor is disabled or enabled by a command transmitted from the controller.

13. A system for monitoring and controlling electrical power to a device, the system comprising:
    a power control assembly comprising
        a processor configured to monitor and measure a power usage through the assembly,
        a temperature sensor,
        a transceiver for receiving commands to the assembly and for transmitting power usage data from the assembly;
    an electrically-powered device, the device electrically powered through the power control assembly; and
    a controller for transmitting a plurality of commands to the power control assembly; and
    wherein a command of the plurality of commands from the controller can control electrical power to the electrically powered device through the processor of the assembly which is configured to control electrical power to the electrically powered device, and wherein the controller receives power usage data for the electrically-powered device from the transceiver of the power control assembly;
    wherein the temperature sensor is configured to monitor an internal temperature of the power control assembly;
    wherein the temperature sensor is configured to monitor a room temperature of a room within a facility;
    wherein the power control assembly with the temperature sensor is a master to a plurality of slave power control assemblies without temperature sensors, wherein a temperature reading outside of a predetermined threshold from the temperature sensor deactivates the power to the plurality of slave power control assemblies.

* * * * *